Jan. 30, 1951   J. D. CHAMBERS   2,539,771
FILTER FOR USE IN MAKING COFFEE
Filed May 3, 1949
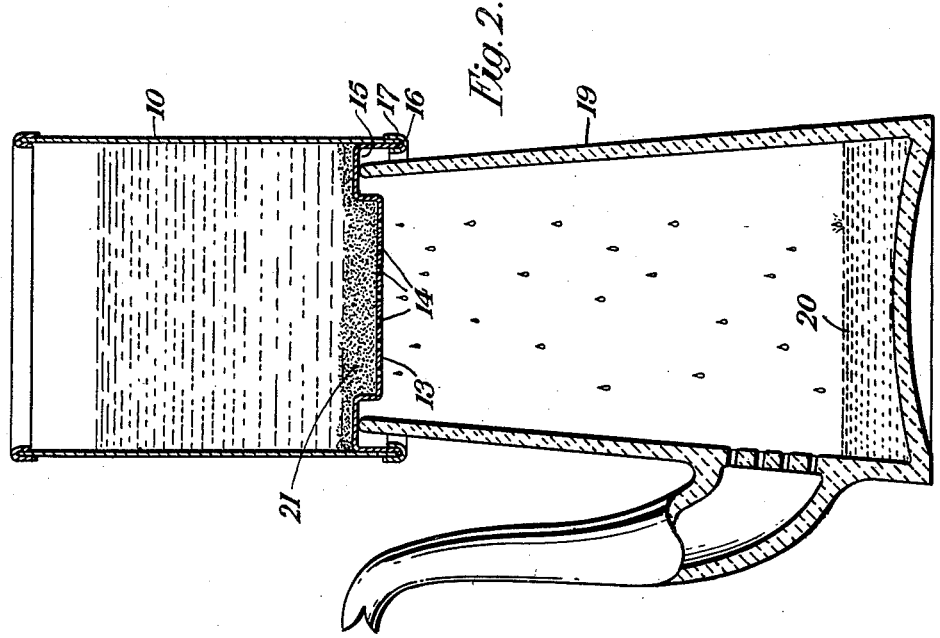
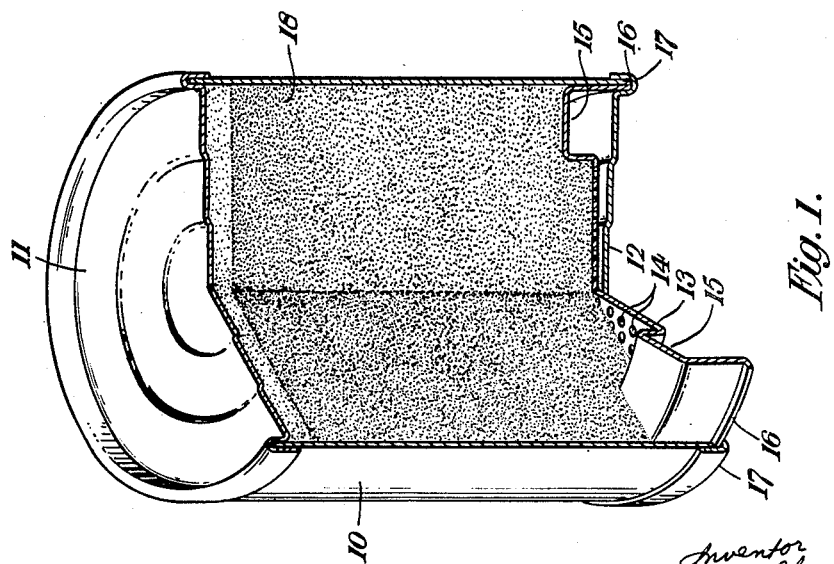
Inventor
Jack Dean Chambers
By Moss, Nolk, Crewe & Berry
Attorneys Patented Jan. 30, 1951

2,539,771

UNITED STATES PATENT OFFICE 2,539,771

FILTER FOR USE IN MAKING COFFEE

Jack Dean Chambers, London, England

Application May 3, 1949, Serial No. 91,131
In Great Britain February 20, 1948

3 Claims. (Cl. 99—77.1)

This invention provides a coffee container having therein a filter which constitutes an integral part of the container, as sold, and which, after removal of the top and bottom of the container, remains secured to the remainder thereof and serves as a filter for use in making coffee.

The invention includes a coffee tin, comprising a cylindrical body, closed by top and bottom walls, and a perforated false bottom located inside the bottom wall, and secured to the cylindrical body, the false bottom having a peripheral part spaced from the bottom wall so as to allow of removal of the bottom wall without damage to the false bottom.

When the top and bottom walls are removed from such a tin, which is preferably done by a tool leaving reasonably smooth edges, for instance a tin opener of the butterfly type, and the coffee has been emptied from the tin, a cylinder attached at its lower end to the perforated false bottom will remain, and this may be used, resting on a pot, jug or other receptacle, as a filter for use in coffee making.

One embodiment of the invention will now be described in detail, by way of example, with reference to the accompanying drawing, in which:

Fig. 1 is a perspective view, partly broken away, of the tin as sold full of coffee, and Fig. 2 is a vertical section through the tin showing its use, after removal of the top and bottom, as a filter in making coffee.

Referring first to Fig. 1, the tin comprises the usual cylindrical body 10 having a top 11 and bottom 12 fitted to it in conventional fashion. The tin illustrated, however, differs from the normal coffee tin by virtue of the provision of a false bottom 13, the central portion only of which is perforated, at 14, and lies closely adjacent the inner face of the real bottom. The peripheral portion of the false bottom 13 is upwardly joggled at 15 and its edge 16 is clenched against the cylindrical body 10 by the turned over lip 17 of the real bottom 12 as clearly shown in Fig. 1.

Due to the provision of the joggled portion 15, the real bottom 12 can be removed by a tin opener without damage to the false bottom 13 which remains attached to the cylindrical body, as shown in Fig. 2, by the lip 17 of the real bottom. When the top 11 has likewise been removed by a tin opener, and the coffee 18 has been emptied from the tin, the residual portion of the tin can be used as a filter for making coffee as shown in Fig. 2, the joggled portion 15 of the false bottom constituting a downwardly open peripheral groove which forms a seating which will fit over the rim of a jug or pot 19 to receive the coffee. The joggled portion 15 may be made of reasonable width so that it will fit a fair range of sizes of jugs. As will be clear from Fig. 2 the coffee 20 will percolate through the perforated part 14 of the false bottom, while the grounds 21 will be retained within the residual portion of the tin.

It will be appreciated that the body of the container need not necessarily be cylindrical, and that the false bottom may be secured to the container in other ways besides clenching. Thus the periphery of the false bottom might be secured to the body of the container, or to the extreme periphery of the real bottom, by welding or soldering.

What I claim as my invention and desire to secure by Letters Patent is:

1. A coffee tin, comprising an impervious body portion, impervious top and bottom walls fixed to said body portion, and a single further wall constituted by a false bottom located inside and fixed to said tin, said false bottom having a perforated central portion lying close to said bottom wall and a peripheral portion spaced sufficiently from said bottom wall to permit of removal of said bottom wall by a tin opener without damage to said false bottom.

2. A coffee tin, comprising an impervious cylindrical body portion, impervious top and bottom walls fixed to said body portion, and a single further wall constituted by a false bottom located inside and fixed to said tin, said false bottom having a perforated central portion lying close to said bottom wall and a peripheral portion spaced from said bottom wall and constituting, when said bottom wall has been removed by a tin opener, a concave seating by which the tin can be rested on the rim of a coffee pot.

3. A coffee tin as claimed in claim 2, wherein said bottom wall has a turned up lip by which the extreme periphery of said false bottom is held to the cylindrical body portion.

JACK DEAN CHAMBERS.

REFERENCES CITED

The following references are of record in the file of this patent:

UNITED STATES PATENTS

| Number | Name | Date |
|---|---|---|
| 770,863 | Koenig | Sept. 27, 1904 |
| 1,209,484 | Peal | Dec. 19, 1916 |
| 1,412,388 | Clermont | Apr. 11, 1922 |